United States Patent [19]
Moore et al.

[11] Patent Number: 4,733,082
[45] Date of Patent: Mar. 22, 1988

[54] GAMMA RAY CAMERA METHODS AND APPARATUS EMPLOYING COOLED SCINTILLATION CRYSTAL

[75] Inventors: John F. Moore, Lake Bluff; Richard T. Bernardi, Prospect Heights, both of Ill.

[73] Assignee: Kabushiki Kaisha Toshiba, Kawasaki, Japan

[21] Appl. No.: 865,826

[22] Filed: May 22, 1986

[51] Int. Cl.⁴ ............................................. G01T 1/164
[52] U.S. Cl. .................................. 250/363 S; 250/261
[58] Field of Search ............. 250/363 SR, 363 SH, 250/363 SG, 363 SF, 363 SE, 363 SD, 363 SC, 363 SB, 363 SA, 261, 370 L, 352

[56] References Cited

U.S. PATENT DOCUMENTS 3,859,523  1/1975  Wilson et al. .................... 250/261
4,484,074 11/1984  Eder ............................... 250/336.1
4,586,785  5/1986  Swinehart ........................ 350/96.28

Primary Examiner—Janice A. Howell
Assistant Examiner—Constantine Hannaher
Attorney, Agent, or Firm—Finnegan, Henderson, Farabow, Garrett & Dunner

[57] ABSTRACT

A method and apparatus for improving the operation of a gamma camera which employs a planar scintillation crystal having a circumferential edge in the form of a mechanism and related method for cooling the crystal by thermally coupling the circumferential edge of the crystal to a heat sink and a mechanism and related method for applying pressure to the circumferential edge of the crystal sufficient to maintain the crystal in compression when cooled and thereby avoid cracking of the crystal due to temperature differentiation across the surface of the crystal.

6 Claims, 3 Drawing Figures

GAMMA RAY CAMERA METHODS AND APPARATUS EMPLOYING COOLED SCINTILLATION CRYSTAL

BACKGROUND OF THE INVENTION

I. Field of the Invention

The present invention relates to methods and apparatus for improving the operation of a gamma camera.

II. Background Information

Gamma cameras are employed to measure gamma rays radiated from a gamma ray source. Gamma cameras typically comprise a gamma ray collimator, a thallium-doped sodium iodide scintillation crystal, a light guide, and a plurality of photomultiplier tubes. The collimator is arranged to permit a selected orientation of gamma rays from the gamma ray source to strike one surface of the sodium iodide scintillation crystal. The photomultiplier tubes are arranged adjacent the opposite surface of the scintillation crystal and are arranged to receive light emanating from the scintillation crystal in response to the incident gamma rays. The light guide is arranged between the scintillation crystal and the photomultiplier tubes to effect the transfer of light from the liquid scintillation crystal to the photomultiplier tubes.

Standard thallium-doped sodium iodide scintillation crystals have a particular response time during normal operation at room temperature.

It is an object of the subject invention to improve the response time of a gamma ray camera, utilizing the fact that pure, undoped sodium iodide has substantially shorter response time than thallium-doped sodium iodide. Pure, undoped sodium iodide is normally not used because its light output is so low that gamma-camera performance would be unacceptably poor. However, light output increases as temperature is lowered. It is an object of this invention to provide a practical means of operating a crystal at reduced temperature.

Additional objects and advantages of the invention will be set forth in the description which follows and in part will be obvious from the description or may be learned by practice of the invention.

SUMMARY OF THE INVENTION

To achieve the foregoing object, and in accordance with the purposes of the invention as embodied and broadly described herein, a method is provided for improving the operation of a gamma camera which employs a planar sodium iodide or the like scintillation crystal having a circumferential edge. This method comprises the steps of cooling the crystal by thermally coupling the circumferential edge to a heat sink and applying pressure to the circumferential edge sufficient to maintain the crystal in compression when cooled.

The step of cooling preferably comprises positioning the crystal within a thermally conductive metallic cylinder with the circumferential edge of the crystal aligned to contact the interior surface of the cylinder. It is further preferable that the step of applying pressure comprised in encasing a band in tension around the outside of the cylinder sufficient to place the crystal in compression.

The subject invention further comprises a gamma camera employing a planar scintillation crystal of sodium iodide or like type having a circumferential edge and further having an improvement comprising a heat sink; a mechanism for cooling the crystal by thermally coupling the circumferential edge of the crystal to the heat sink; and a mechanism for applying pressure to the circumferential edge sufficient to maintain the crystal in compression when cooled. The mechanism for cooling preferably comprises a thermally conductive metallic cylinder having at least one open end, with the crystal position within the cylinder adjacent that open end and the circumferential edge of the crystal aligned to contact the interior surface of the cylinder, and with the other end of the cylinder in thermal contact with the heat sink. Furthermore, the mechanism for applying pressure preferably comprises a tension band positioned around the outside of the cylinder adjacent the open end of the cylinder, with the band being in sufficient tension to place the crystal in compression.

DESCRIPTION OF THE PREFERRED EMBODIMENT

Reference will now be made in detail to the present preferred embodiment of the invention as illustrated in the accompanying drawings.

Figure 1:
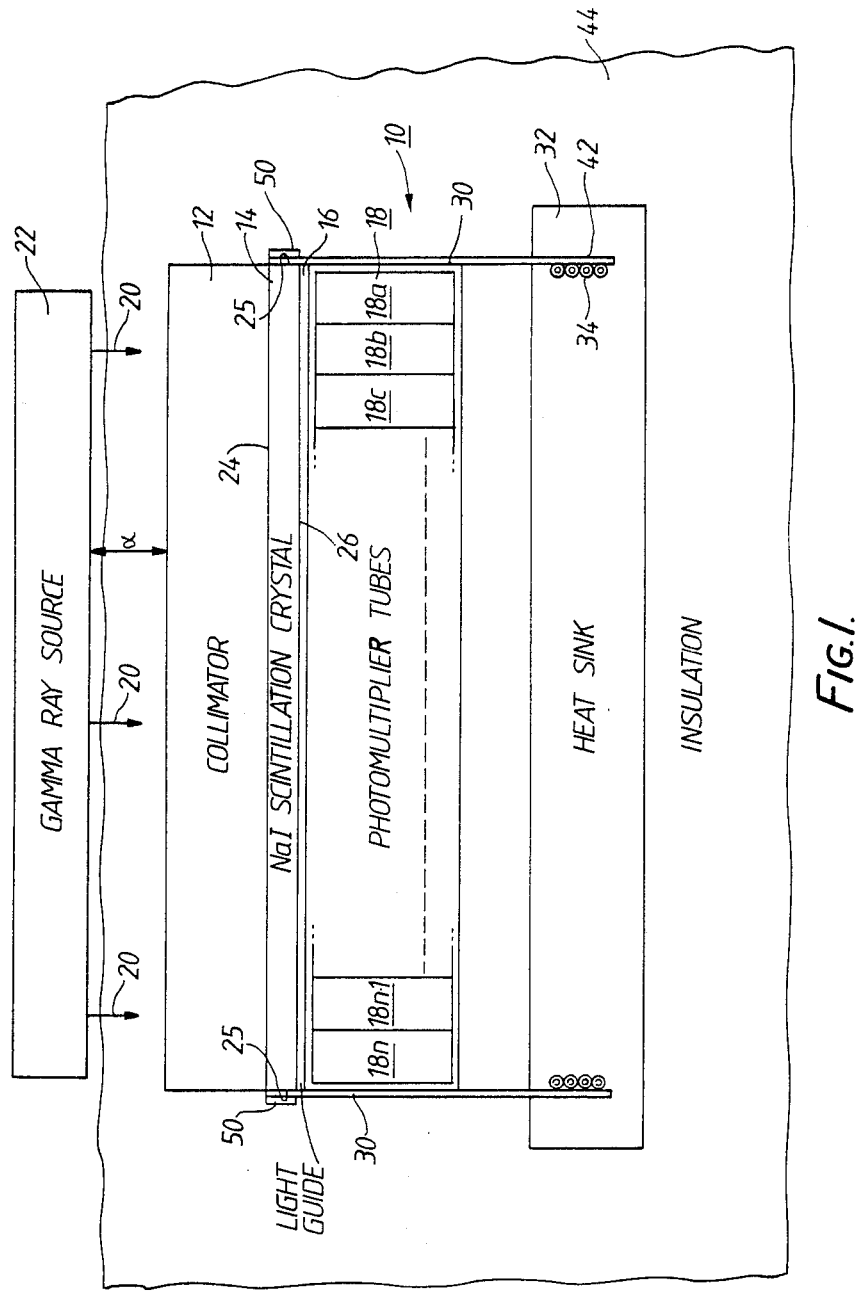
FIG. 1 is a diagrammatic cross-sectional view of a gamma camera incorporating the teachings of the present invention.

FIG. 1 is a cross-sectional view of a gamma camera 10. As shown in FIG. 1, gamma camera 10 comprises a collimator 12, a scintillation crystal 14, a light guide 16 and a plurality of photomultiplier tubes 18, with individual tubes aligned as in 18a, 18b, et al. As should be well known to those skilled in the art, collimator 12 is aligned with scintillation crystal 14 to permit gamma rays 20 from gamma ray source 22 which are directed perpendicular to upper surface 24 of scintillation crystal 14 to pass through collimator 12 and reach upper surface 24 of scintillation crystal 14. As is also well known to those skilled in the art, scintillation crystal 14 is composed of sodium iodide or the like and therefore emits light internally in response to the receipt of gamma rays 20 on upper surface 24. Light from lower surface 26 passes through light guide 16 to strike photomultiplier tubes 18. The output of photomultiplier tubes 18 is employed to provide an indication of the location and density of gamma rays 20 from gamma ray source 22.

Scintillation crystal 14 preferably comprises a slab of pure, undoped sodium iodide having a diameter from 30 centimeters to 50 centimeters and a thickness of 7.5 millimeters to approximately 12.5 millimeters. Such crystals typically have a thermal expansion of approximately $47 \times 10^{-6}$ parts per million per degree centigrade. Other similar substances in place of sodium iodide might be used to form the planar scintillation crystal to which the teachings of the subject invention apply.

Traditional gamma cameras operate with scintillation crystal 14 at room temperature of approximately 27° C. However, in the case of pure, undoped sodium iodide, the light output of scintillation crystal 14 can be improved by operating scintillation crystal 14 at a reduced temperature of approximately −123° C. At an operating temperature of −123° C., the response time of scintillation crystal 14 is substantially shorter than that of thallium-doped sodium iodide, but the overall conversion efficiency of scintillation crystal 14 is much greater than at room temperature.

One method for maintaining scintillation crystal 14 at a low temperature of approximately −123° C. during operation would be to immerse a portion of collimator 12, the entire crystal 14, the entire light guide 16 and a portion of photomultiplier tubes 18 in a liquid nitrogen bath. With this arrangement, however, bubbles would flow from an area where the liquid nitrogen boiled because of heat input. This bubble flow would recreate a temperature differential, rendering it difficult to maintain uniform temperature across the scintillation crystal.

Figure 2:
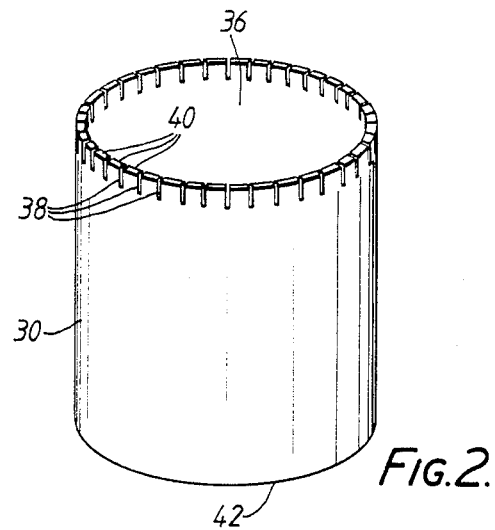
FIG. 2 is a perspective view of a thermally conductive metallic cylinder employed in the gamma camera of FIG. 1.

Instead, the preferred embodiment of the present invention provides for liquid scintillation crystal 14 to be maintained at a low temperature as is illustrated in FIG. 1, by the utilization of a thermally conductive metallic cylinder 30 and a heat sink 32 comprising, for example, coiled tubing 34 through which liquid nitrogen may pass. Specifically, as illustrated in FIG. 2, thermally conductive metallic cylinder 30 is preferably made of copper, aluminum, or other high-conductivity metal or alloy. Such materials have conductivities between 2 and 7 watts per cm per °C. Cylinder 30 has at least one open end 36 into which a plurality of parallel, longitudinally-aligned cuts 38 have been made in order to form a plurality of upstanding teeth 40. The inside diameter of cylinder 30 corresponds with the outside diameter of circumferential edge 25 of scintillation crystal 14 so that scintillation crystal 14 may be placed within cylinder 30 adjacent open end 36, with the circumferential edge of scintillation crystal 14 in contact with the internal surface of cylinder 30 comprising teeth 40.

As illustrated in FIG. 1, the opposite end 42 of cylinder 30 is coupled to heat sink 32 so that cylinder 30 provides a mechanism for thermally coupling the circumferential edge of scintillation crystal 14 to heat sink 32. As is further illustrated in FIG. 1, heat sink 32 comprises a plurality of coiled tubing 34 constructed of thermally conductive metallic tubing through which liquid nitrogen may pass, thereby lowering the temperature of tubing 34, the temperature of cylinder 30 and, in turn, the temperature of scintillation crystal 14.

The arrangement of FIG. 1 thus far described is a simple, yet effective, mechanism for maintaining liquid scintillation crystal 14 at a reduced temperature. Specifically, if liquid nitrogen has a temperature of approximately 75° kelvin, the arrangement of FIG. 1 may be operated to keep the circumferential edge of scintillation crystal 14 at approximately 150° kelvin. If camera 10 of FIG. 1 were encased in theoretically perfect insulation 44, the temperature across scintillation crystal 14 would assume a theoretically uniform value. However, in fact, there is a limit to the thickness and efficiency of insulation 44 dictated by the maximum distance "d" which may exist between gamma ray source 22 and the upper surface of colliminator 12 and still obtain effective operation of camera 10.

Given present-day technology, distance "d" is on the order of 2.5 centimeters. Thus, if insulation 44 were of a standard variety having a thermal conductivity of 0.004 (btu/hour)/(ft$^2$). °F/ft or $7 \times 10^{-5}$ watts per cm °C., and if insulation 44 had a thickness of approximately 7.5 centimeters at the sides and a thickness "d" of approximately 2.5 centimeters at the top, the total in-flowing heat load at the top of insulation 44 would be on the order of 8 watts ($7 \times 10^{-5}$ watts/centimeter °C. (coefficient for insulation 44) × 150° C. (temperature differential between inside and outside insulation 44) × 1963 cm$^2$ (assuming a 50 cm diameter crystal) ÷ 2.5 cm (distance "d") = 8.24 watts).

In the configuration of FIG. 1, this 8-watt total in-flowing heat load will result in a center-to-edge differential in crystal temperature on the order of 6.6° C. Thus, while the circumferential edge of scintillation crystal 14 may be kept at approximately −126° C. through the operation of cylinder 30 and heat sink 32, the center of scintillation crystal 14 may be at approximately −120° C.

This 6° C. temperature differential may subject scintillation crystal 14 to cracking. To minimize the likelihood of such cracking and, in accordance with the subject invention, a mechanism is provided to apply substantially uniform pressure to the circumferential edge of the crystal sufficient to maintain the crystal in compression when cooled. As illustrated in FIG. 1, this pressure may be applied by encasing the circumferential edge of scintillation crystal 14 in a tension band 50. Tension band 50 is then placed in sufficient tension, for example, through operation of a spring-loaded tension control of the type illustrated by tension control 52 in FIG. 3, sufficient to maintain scintillation crystal 14 in compression when cooled to −126° C. Teeth 40 of cylinder 30 are forced together by the operation of band 50 to permit transferral of a compressive force from band 50 to the circumferential edge of crystal 14.

Assuming scintillation crystal 14 comprises sodium iodide having a coefficient of expansion of approximately 50 parts per million per degree centigrade, and assuming scintillation crystal 14 is approximately 60 centimeters in circumference, cooling scintillation crystal 14 100° C. from approximately 27° C. to −126° C. would result in a circumferential change of approximately 0.3 inches. Accordingly, spring tensioning mechanism 52 must be constructed to maintain a uniform tension over a change of approximately 0 3 inches. Obviously to the extent that band 52 also shrinks upon cooling, the distance over which constant tension must be maintained correspondingly decreases.

Figure 3:
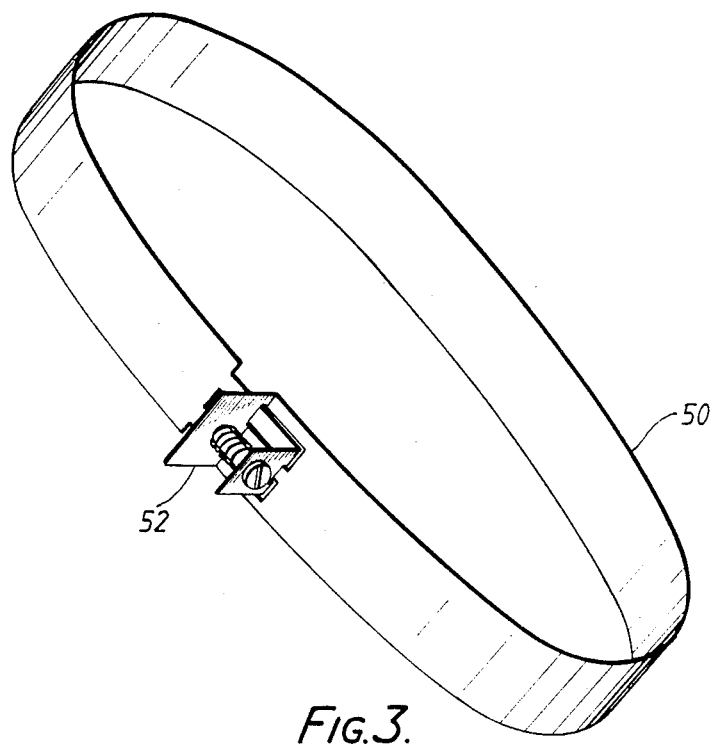
FIG. 3 is a perspective view of a tension band employed in the gamma camera of FIG. 1.

In addition to or instead of using a spring tensioning device 52 of the type illustrated in FIG. 3, a cone washer spring or the like may also be employed.

Although standard insulation may be employed, the so-called "super insulation" comprising layers of aluminized mylar might also be employed which would result in a further reduction of the temperature differential across scintillation crystal 14.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicants' generic inventive concept.

We claim:

1. A method for improving the operation of a gamma camera which employs a planar scintillation crystal having a circumferential edge, comprising the steps of
    (a) cooling said crystal by thermally coupling said circumferential edge to a heat sink; and
    (b) applying pressure to said circumferential edge sufficient to maintain said crystal in compression when cooled.

2. A method of claim 1 wherein said step of cooling comprises positioning said crystal within a thermally conductive metallic cylinder with said circumferential edge of said crystal aligned to contact the interior surface of said cylinder.

3. A method of claim 2 wherein said step of applying pressure comprises encasing a band in tension around the outside of said cylinder sufficient to place said crystal in compression.

4. In a gamma camera employing a planar scintillation crystal having a circumferential edge, the improvement comprising:
(a) a heat sink;
(b) means for cooling said crystal by thermally coupling said circumferential edge to said heat sink; and
(c) means for applying pressure to said circumferential edge sufficient to maintain said crystal in compression when cooled.

5. A gamma camera of claim 4 wherein said means for cooling comprises a thermally conductive metallic cylinder having at least one open end, said crystal being positioned within said cylinder adjacent said open end with said circumferential edge of said crystal aligned to contact the interior surface of said cylinder and with the other end of said cylinder in thermal contact with said heat sink.

6. A gamma camera of claim 5 wherein said means for applying pressure comprises a tension band positioned around the outside of said cylinder adjacent said open end, said band being in sufficient tension to place said crystal in compression.

* * * * *